United States Patent
Ono

(10) Patent No.: US 6,246,730 B1
(45) Date of Patent: Jun. 12, 2001

(54) METHOD AND ARRANGEMENT FOR DIFFERENTIALLY DETECTING AN MPSK SIGNAL USING A PLURALITY OF PAST SYMBOL DATA

(75) Inventor: Shigeru Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/106,521

(22) Filed: Jun. 29, 1998

(51) Int. Cl.$^7$ .............................. H03D 3/22; H04L 27/22
(52) U.S. Cl. ............................................. 375/332; 329/304
(58) Field of Search ...................................... 375/332, 329, 375/341, 262, 269, 271, 279, 280; 329/304

(56) References Cited

U.S. PATENT DOCUMENTS

| | | | |
|---|---|---|---|
| 5,017,883 | * 5/1991 | Divsalar et al. | 329/304 |
| 5,533,060 | * 7/1996 | Kameo et al. | 375/332 |
| 5,619,167 | * 4/1997 | Adachi | 329/304 |
| 5,898,739 | * 4/1999 | Doi | 375/341 |

FOREIGN PATENT DOCUMENTS

| | | |
|---|---|---|
| 4-170129 | 6/1992 | (JP) . |
| 6-237280 | 8/1994 | (JP) . |
| 7-336406 | 12/1995 | (JP) . |
| 96/00475 | 1/1996 | (WO) . |
| 9429990 | 12/1996 | (WO) . |

OTHER PUBLICATIONS

D. Divsalar, et al., "Multiple–Symbol Differential Detection of MPSK", *IEEE* Transactions of Communications, vol. 38, No. 3, Mar. 1990.

* cited by examiner

*Primary Examiner*—Chi Pham
*Assistant Examiner*—Phuong Phu
(74) *Attorney, Agent, or Firm*—Ostrolenk, Faber, Gerb & Soffen LLP

(57) ABSTRACT

In order to differentially detect a multiple-phase shift keying (MPSK) signal, a predetermined number of phase signals are stored at successive symbol time points. Next, a plurality of phase differences between the phase signals stored in the above are calculated. Subsequently, a symbol value of the MPSK signal is determined or estimated at a current symbol time point using the calculated phase differences and using symbol values already determined at a plurality of preceding symbol time points.

9 Claims, 5 Drawing Sheets

$$\begin{cases} \theta_1 = \phi_k - \phi_{k-1} = \delta\phi_k \\ \theta_2 = \phi_k - \phi_{k-2} = \delta\phi_k + \delta\phi_{k-1} \\ \theta_3 = \phi_k - \phi_{k-3} = \delta\phi_k + \delta\phi_{k-1} + \delta\phi_{k-2} \end{cases}$$

$$\begin{cases} \theta_4 = \phi_{k-1} - \phi_{k-2} = \delta\phi_{k-1} \\ \theta_5 = \phi_{k-1} - \phi_{k-3} = \delta\phi_{k-1} + \delta\phi_{k-2} \\ \theta_6 = \phi_{k-2} - \phi_{k-3} = \delta\phi_{k-2} \end{cases}$$

METHOD AND ARRANGEMENT FOR DIFFERENTIALLY DETECTING AN MPSK SIGNAL USING A PLURALITY OF PAST SYMBOL DATA

BACKGROUND OF THE INVENTION

1. Field of the Invention

The present invention relates generally to a differential detection technique for MPSK (multiple-phase shift keying), and more specifically to a method of implementing differential detection for MPSK using multiple-symbol observation interval. The instant invention is highly suited for use in a digital mobile communications system wherein signal transmission paths are susceptible to multipath phasing or the like.

2. Description of the Related Art

It is known in the art that in applications where signal transmission tends to be deteriorated due to multipath fading, differential detection is preferably used rather than coherent detection. One approach to reduce the incidence of error inherent in differential detection is to use multiple symbols. One example of such techniques is disclosed in a paper entitled "Multiple-Symbol Differential Detection of MPSK" by D. Divsalar, et al., IFFE Transactions on Communications, Vol. 38, March 1990.

According to this technique art, a plurality of symbols are simultaneously detected using differential detection techniques. That is, the related art says that increasing the number of symbols simultaneously demodulated provides improved detection characteristics.

However, the prior art has suffered from the problem that the amount of calculation becomes extremely large and the hardware needed to perform this process becomes extremely bulky.

SUMMARY OF THE INVENTION

It is therefore an object of the present to provide a method of implementing differential detection using multiple symbols without the associated increase in the amount of calculation experienced in the prior art.

In brief, these objects are achieved by a technique wherein in order to differentially detect a multiple-phase shift keying (MPSK) signal, a predetermined number of phase signals are stored at successive symbol time points. Thereafter, a plurality of phase differences between the stored phase signals are calculated. Subsequently, a symbol value of the MPSK signal is determined or estimated at a current symbol time point using the calculated phase differences obtained in the and using symbol values already determined at a plurality of preceding symbol time points.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

As is well known in the art, in order to implement differential detection at a receiver, input information received by a transmitter must be differentially encoded before transmission over a channel. The differential encoding at the transmitter is represented by $$\Phi_k = \Phi_{k-1} + \delta\Phi_k \quad (1)$$

where $\Phi_k$ denotes a phase of a transmit signal at a symbol time point "k", $\Phi_{k-1}$ denotes a phase of the transmit signal at a previous symbol time point "k-1", and $\delta\Phi_k$ denotes a phase difference between $\Phi_k$ and $\Phi_{k-1}$.

For the sake of convenience of description, the instant invention will be discussed as applied to a QPSK (quaternary phase shift keying) demodulator. However, it should be understood that the present invention is in no way limited to such an application and is also applicable to binary PSK, 8-phase PSK and the like.

Figure 1:
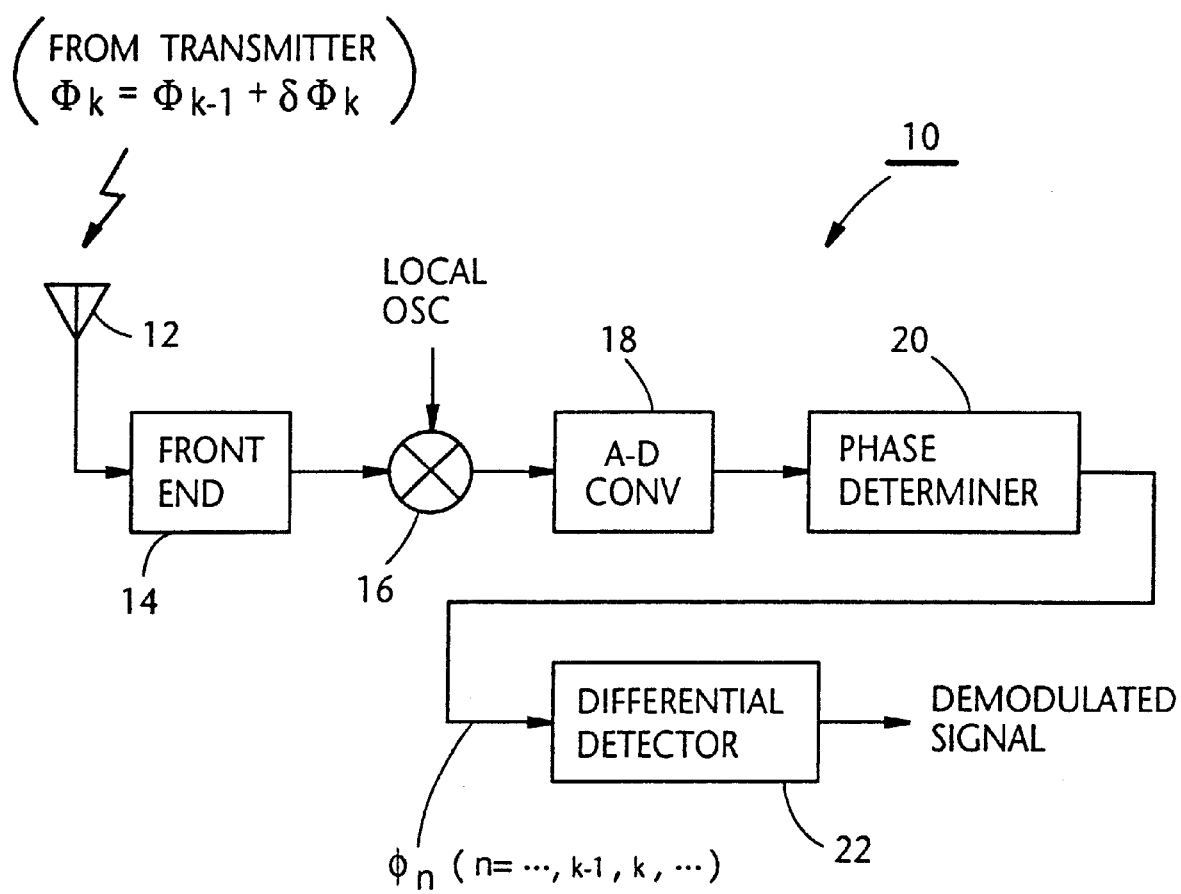
FIG. 1 is a block diagram schematically showing part of a digital mobile radio receiver to which the present invention is applicable.

Before turning to a preferred embodiment of the present invention, it is deemed advantageous to briefly describe, with reference to FIG. 1, part of a receiver section of a mobile communications unit to which the present invention is applicable.

As shown in FIG. 1, a mobile radio receiver 10 comprises an antenna 12 via which a code-modulated carrier conveying the phase information $\Phi_k$ (Equation (1)) is received. A front end (viz., radio section) 14 is provided for amplifying and demodulating a modulated carrier wave (viz., channel frequency) received by the antenna 12. Although not shown in FIG. 1, the front end 14 is comprised of a high frequency amplifier, a frequency converter, and IF (Intermediate frequency) amplifier, and a discriminator. An IF signal outputted from the front end 14 is converted to a base band signal at a mixer 16 to which a local oscillator (no reference numeral) is operatively coupled. The base band signal thus generated is digitized at an analog-to-digital (A–D) converter 18. The digital signal from the A–D converter is supplied to a phase determiner 20, which in turn generates successive phase signals $\phi_n$(n= . . . , k, k-1, . . . ) at symbol time points based on the applied digital signal. The phase signals $\phi_n$ are successively applied to a differential detector 22, with which the present invention is directly concerned.

Figure 2:
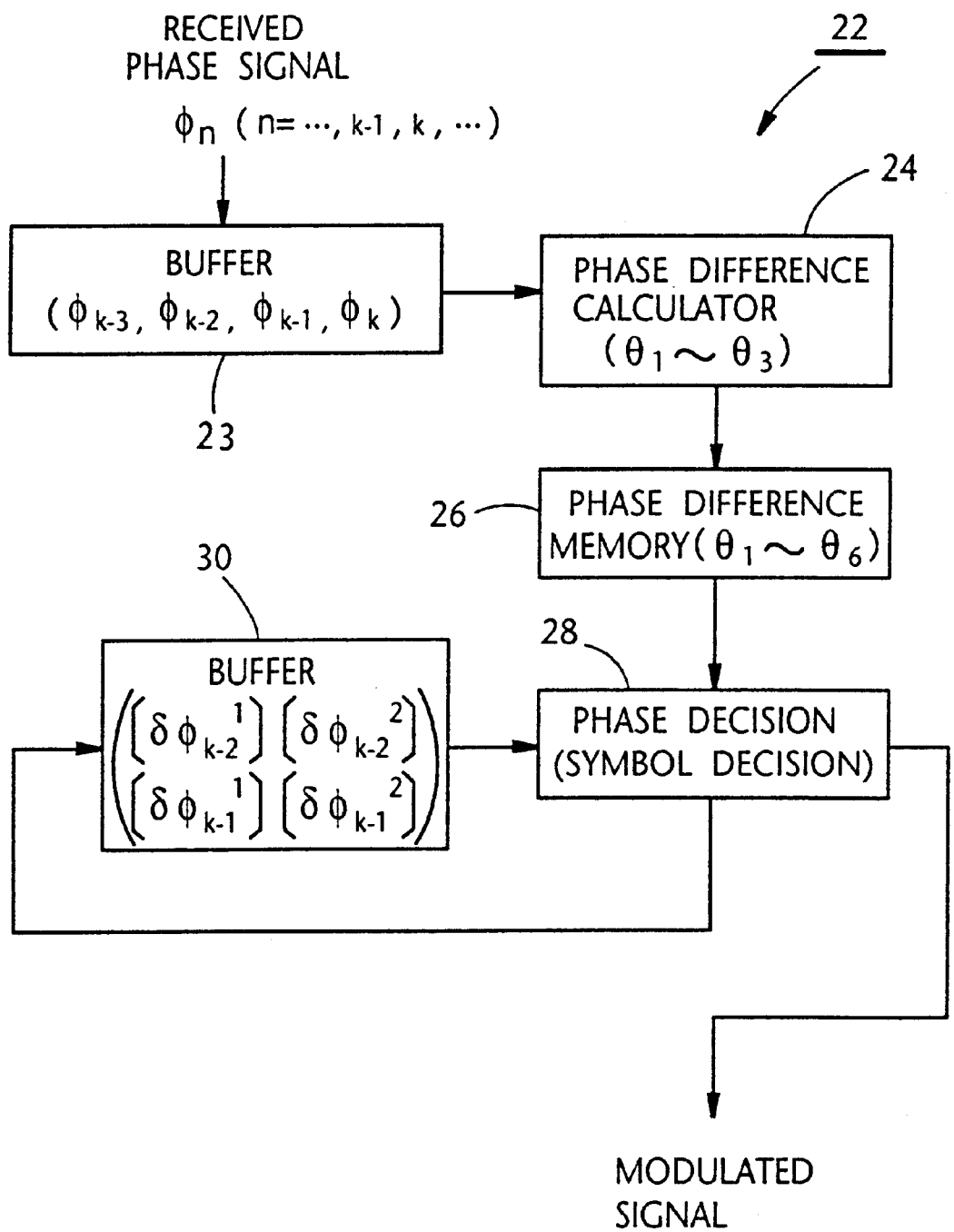
FIG. 2 is a diagram for describing operations in accordance with an embodiment of the present invention.

FIG. 2 is a diagram illustrating a plurality of functional blocks of the differential detector 22 (FIG. 1) whose operations will be described with reference to FIGS. 3A and 5B.

As shown in FIG. 2, the differential detector 22 comprises a buffer 23 which temporarily stores four phase signals $\phi_{k-3}$, $\phi_{k-2}$, $\phi_{k-1}$ and $\phi_k$ in this particular case. It is understood that the four phase signals $\phi_{k-3}$, $\phi_{k-2}$, $\phi_{k-1}$ and $\phi_k$ involve or contain six phase difference data $\theta_1, \theta_2, \theta_3, \theta_4, \theta_5$ and $\theta_6$ as illustrated in FIG. 3A. More specifically, the phase difference data $\theta_1$–$\theta_6$ are given by $$\theta_1 = \phi_k - \phi_{k-1} = \delta\phi_k$$

$$\theta_2 = \phi_k - \phi_{k-2} = \delta\phi_k + \delta\phi_{k-1}$$

$$\theta_3 = \phi_k - \phi_{k-3} = \delta\phi_k + \delta\phi_{k-1} + \phi\delta_{k-2}$$

$$\theta_4 = \phi_{k-1} - \phi_{k-2} = \delta\phi_{k-1}$$

$$\theta_5 = \phi_{k-1} - \phi_{k-3} = \delta\phi_{k-1} + \delta\phi_{k-2}$$

$$\theta_6 = \phi_{k-2} - \phi_{k-3} = \delta\phi_{k-2}$$

Figures 3A, 3B:
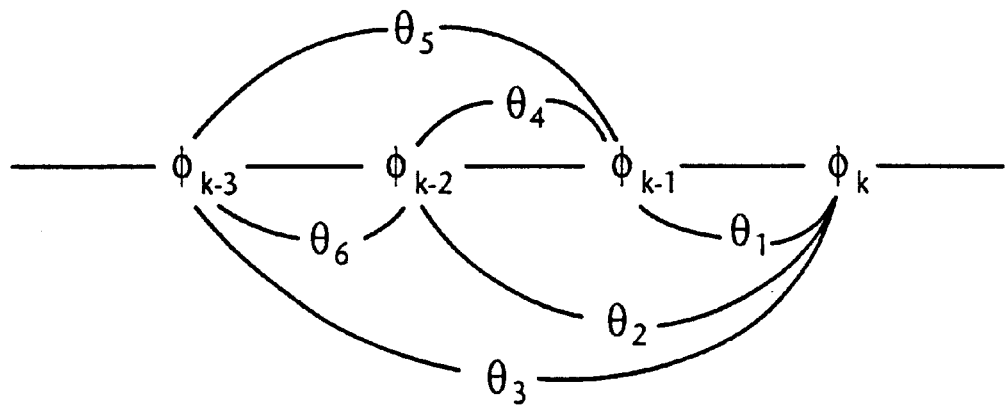
FIG. 3A is a diagram for describing phase difference data obtained from incoming phase information in accordance with the preferred embodiment.
FIG. 3B shows equations representing relationships of phase differences obtained from FIG. 3A.

These relationships are also listed in FIG. 3B. The phase difference data $\theta_1$, $\theta_2$ and $\theta_3$ are calculated at a phase difference calculator 24. These data $\theta_1$, $\theta_2$ and $\theta_3$ are stored in a phase difference memory 26. The memory 26 has already stored the previous phase difference data $\theta_4$, $\theta_5$ and $\theta_6$, which respectively correspond to $\theta_1$, $\theta_2$ and $\theta_3$.

The differential detector 22 has received the newest phase signal $\phi_k$ which corresponds to the original phase signal $\Phi_k$. Therefore, it is necessary for the detector 22 to specify (viz., estimate or determine) the value of a transmitted symbol (viz., original) symbol $\delta\Phi_k$. The instant embodiment is being described as applied to QPSK and accordingly, the transmitted symbol $\delta\Phi_k$ is chosen (viz., estimated) among the four values of $\pm\pi/4$ and $\pm 3\pi/4$. The estimation is carried out at a phase decision circuit 28 using the data $\theta_1$ to $\theta_6$ stored in the memory 26 and four phase difference data $$[\delta\phi_{k-2}^1], [\delta\phi_{k-2}^2], [\delta\phi_{k-1}^1], \text{ and } [\delta\phi_{k-1}^2]$$

which are stored in a buffer 30.

The phase difference $[\delta\phi_{k-2}^1]$ represents the most likely "transmitted symbol" previously determined at the symbol point (k-2) which was outputted from the differential detector 22 as a modulated signal. On the other hand, the phase difference signal $[\delta\phi_{k-2}^2]$ is the second most likely "transmitted symbol" previously determined at the same symbol point (k-2). However, this signal $[\delta\phi_{k-2}^2]$ was not outputted as the differential detection result but was stored or reserved to estimate the original symbol $\delta\Phi_k$. In a similar manner, the phase difference data $[\delta\phi_{k-1}^1]$ represents the most likely "transmitted symbol" determined at the preceding symbol point (k-1) which was outputted from the differential detector 22 as a modulated signal, whilst the phase difference signal $[\delta\phi_{k-1}^2]$ is the second most likely "transmitted symbol" previously determined at the same symbol point (k-1). However, this signal $[\delta\phi_{k-1}^2]$ was not outputted as the differential detection result but was stored or reserved to estimate the original symbol $\delta\Phi_k$.

Figure 4:
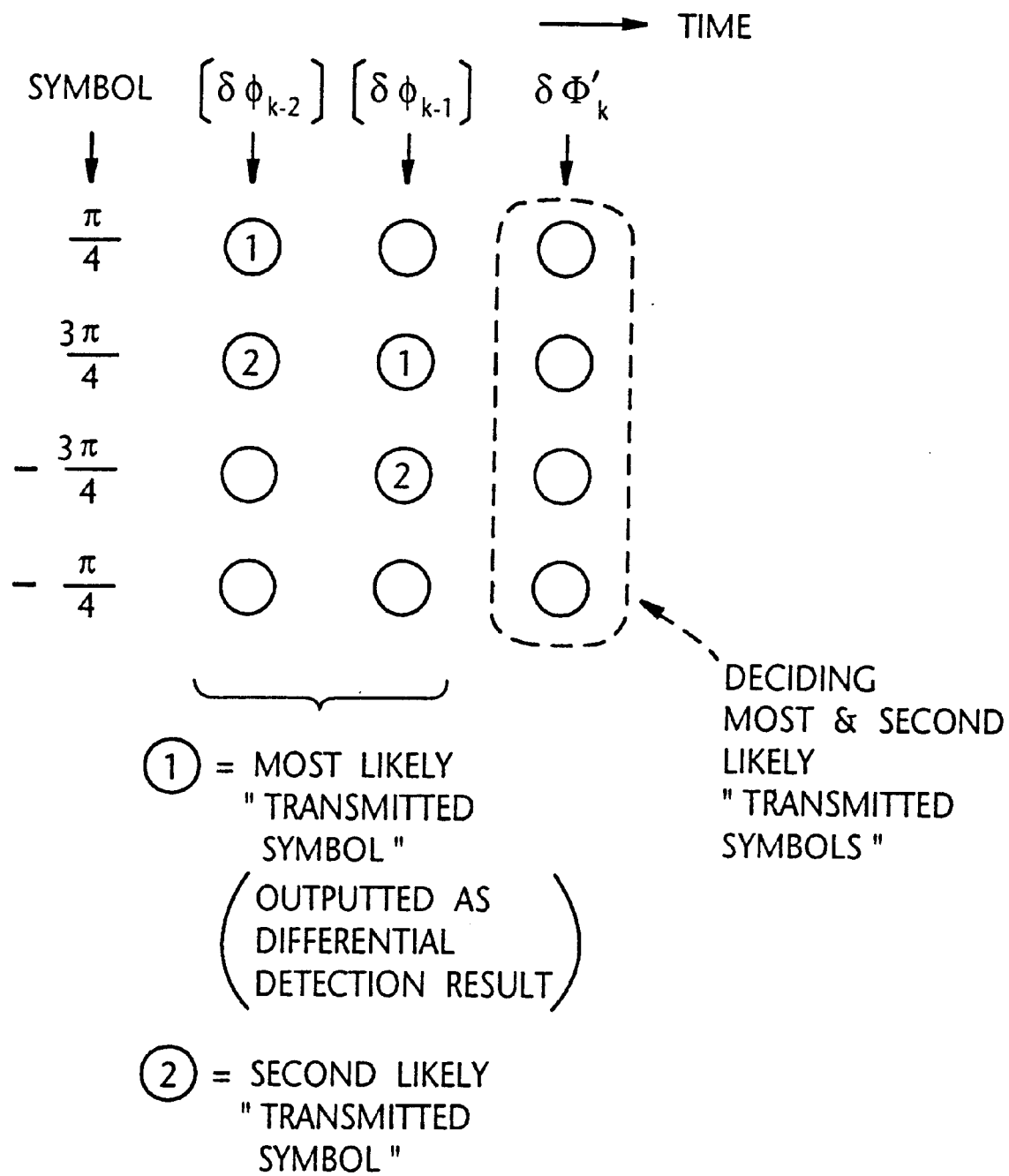
FIG. 4 is a block diagram for describing multiple-symbol differential detection of MPSK in accordance with the preferred embodiment of the present invention.

Referring to FIG. 4, it is assumed that the above mentioned phase difference data $[\delta\phi_{k-2}^1]$ has been estimated or determined to assume the symbol (viz., value) of $\pi/4$, while the phase difference data $[\delta\phi_{k-2}^2]$ has been specified to assume the symbol of $3\pi/4$. Likewise, it is assumed that the aforesaid phase difference data $[\delta\phi_{k-1}^1]$ has been determined to assume the symbol of $3\pi/4$, while the phase difference data $[\delta\phi_{k-1}^2]$ has been specified to assume the symbol of $-3\pi/4$.

In order to determine the most likely "transmitted symbol" in connection with $\delta\Phi_k^1$ at the symbol point k, the following equation is used.

$$Q = (\theta_1 - \delta\Phi_k^1)^2$$
$$+ (\theta_2 - (\delta\Phi_k^1 + [\delta\phi_{k-1}^M]))^2$$
$$+ (\theta_3 - (\delta\Phi_k^1 + [\delta\phi_{k-1}^M] + [\delta\phi_{k-2}^J]))^2$$
$$+ (\theta_4 - [\delta\phi_{k-1}^M])^2$$
$$+ (\theta_5 - ([\delta\phi_{k-1}^M] + [\delta\phi_{k-2}^J]))^2$$
$$+ (\theta_6 - [\delta\phi_{k-2}^J])^2$$

where J=1, 2, M=1, 2, and $\delta\Phi_k^1$ assumes $\pm\pi/4$ and $\pm 3\pi/4$.

Figure 5A:
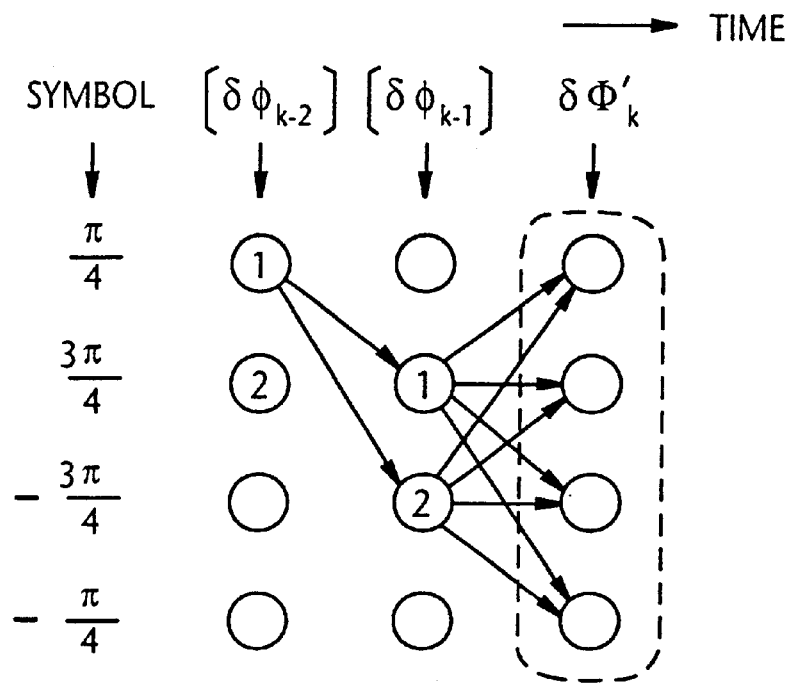
FIGS. 5A and 5B are each diagram which shows combinations used to determine a transmitted symbol according to the embodiment.
Figure 5B:
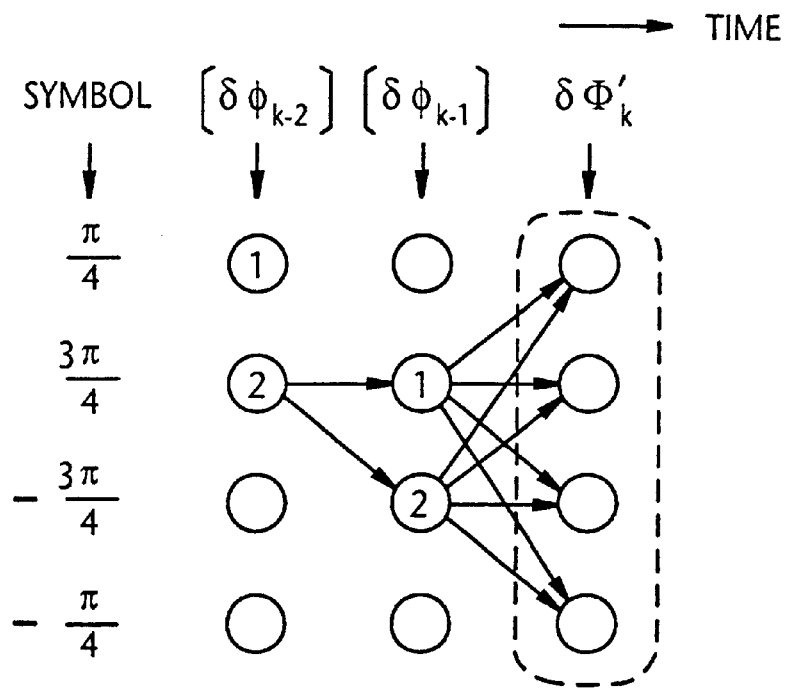

Each of J, M and $\delta\Phi_k^1$ in the above equation takes its own values independently and thus, Q assumes 16 sums in total, the manner of which is shown in FIGS. 5A and 5B. It is therefore understood that the symbol value of $\delta\Phi_k^1$ which minimizes the value of Q, is the most likely "transmitted symbol" of $\delta\Phi_k^1$. minimum, is the most likely. On the other hand, the symbol value of $\delta\Phi_k^1$ which causes the value of Q to be second next lowest, is the second most likely "transmitted symbol" of $\delta\Phi_k^1$.

As mentioned above, the most likely "transmitted symbol" of $\delta\Phi_k^1$ is outputted as the modulated signal. The most and second most likely "transmitted symbols" are stored in the buffer 30 and retrieved for use in determining the subsequent two symbols.

In the foregoing, the present invention has been described with reference to QPSK. However, it is to be noted that the present invention is in no way limited to QPSK. It is understood that the instant invention is also applicable to BPSK (binary PSK), 8-phase PSK, and the like.

It will be understood that the above disclosure is representative of only one possible embodiment of the present invention and that the concept on which the invention is based is not specifically limited thereto.

What is claimed is:

1. A method of differentially detecting a multiple-phase shift keying (MPSK) signal, comprising the steps of:

(a) storing a predetermined number of phase signals generated at successive symbol time points;

(b) calculating a plurality of phase differences between the phase signals stored in step (a); and (c) determining a symbol value of the MPSK signal at a current symbol time point using the phase differences obtained in step (b) and using symbol values previously determined at a plurality of preceding symbol time points.

2. A method as claimed in claim 1, wherein the symbol values previously determined at each of said plurality of preceding symbol time points includes at least a most likely value and a second-most likely value.

3. A method as claimed in claim 1, wherein the MPSK signal is a quadrature PSK signal.

4. A method of differentially detecting a quadrature PSK signal, comprising the steps of:

(a) storing four phase signals $\phi_k$, $\phi_{k-1}$, $\phi_{k-2}$ and $\phi_{k-3}$ generated at successive symbol time points k, k-1, k-2 and k-3, respectively, wherein k indicates a current symbol time point;

(b) calculating three phase differences $\Theta_1$, $\Theta_2$ and $\Theta_3$ between the phase signal $\phi_k$ and each of the phase signal $\phi_{k-1}$, $\phi_{k-2}$ and $\phi_{k-3}$, respectively;

(c) storing the three phase differences calculated at step (b) in a phase difference memory, the phase difference memory having previously stored an additional three phase differences $\Theta_4$, $\Theta_5$ and $\Theta_6$ between $\phi_{k-1}$ and $\phi_{k-2}$, $\phi_{k-1}$ and $\phi_{k-3}$, and $\phi_{k-2}$ and $\phi_{k-3}$, respectively; and (d) determining a symbol value of the quadrature PSK signal at the current symbol time point using the phase differences stored in the phase difference memory and using symbol values previously determined at the preceding symbol time points k-1 and k-2.

5. A method as claimed in claim 4, wherein the symbol values previously determined at each of the symbol time points k-1 and k-2 consists of a most likely value and a second-most likely value.

6. A differential detector provided in a receiver used in a digital communications system for detecting a multiple-phase shift keying (MPSK) signal, the differential detector comprising:

a first memory for temporarily storing a predetermined number of phase signals input thereto at successive symbol time points;

a phase difference calculator for calculating a plurality of phase differences between the phase signals stored in the first memory;

a second memory for storing said plurality of phase differences calculated at the phase difference calculator; and a phase symbol determiner for determining a symbol value of the MPSK signal at a current symbol time point using the phase differences stored in the second memory and using symbol values previously determined at a plurality of preceding symbol time points.

7. A differential detector as claimed in claim 6, wherein the phase symbol determiner determines a most likely value and a second-most likely value of the MPSK signal at the current symbol time point using the phase differences stored in the second memory and using a most likely value and a second-most likely value for each of the plurality of preceding symbol time points which have been previously determined at each of the preceding symbol time points.

8. A differential detector provided in a receiver used in a digital communications system for detecting a quadrature PSK signal, the differential detector comprising:

a first memory for storing four phase signals $\phi_k$, $\phi_{k-1}$, $\phi_{k-2}$ and $\phi_{k-3}$ input thereto at successive symbol time points k, k-1, k-2 and k-3, respectively, wherein k indicates a current symbol time point;

a phase difference calculator for calculating three phase differences $\Theta_1$, $\Theta_2$ and $\Theta_3$ between the phase signal $\phi_k$ and each of the phase signal $\phi_{k-1}$, $\phi_{k-2}$ and $\phi_{k-3}$, respectively;

a second memory for storing the three phase differences calculated at the phase difference calculator and for storing an additional three phase differences $\Theta_4$, $\Theta_5$ and $\Theta_6$ previously calculated between the phase signal $\phi_{k-1}$ and $\phi_{k-2}$, $\phi_{k-1}$ and $\phi_{k-3}$, and $\phi_{k-2}$ and $\phi_{k-3}$, respectively; and a phase symbol determiner for determining a symbol value of the quadrature PSK signal at the current symbol time point using the phase differences stored in said second memory and using symbol values previously determined at the preceding symbol time points k-1 and k-2.

9. A differential detector as claimed in claim 8, wherein the phase symbol determiner determines a most likely value and a second-most likely value of the quadrature PSK signal at the current symbol time point using the phase differences stored in the second memory and using a most likely value and a second-most likely value for each of the preceding symbol time points k-1 and k-2 which have been previously determined at the respective preceding symbol time points.

* * * * *